United States Patent
Seitz (10) Patent No.: US 11,543,230 B2
(45) Date of Patent: Jan. 3, 2023

(54) ARTICULATING PROBE

(71) Applicant: Carl Zeiss Industrielle Messtechnik GmbH, Oberkochen (DE)

(72) Inventor: Dominik Seitz, Schwaebisch Gmuend (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 277 days.

(21) Appl. No.: 16/894,829

(22) Filed: Jun. 7, 2020

(65) Prior Publication Data
US 2020/0386531 A1    Dec. 10, 2020

(30) Foreign Application Priority Data
Jun. 7, 2019   (DE) .................... 10 2019 115 630.0

(51) Int. Cl.
| | |
|---|---|
| *G01B 5/016* | (2006.01) |
| *G01B 7/008* | (2006.01) |
| *G01B 11/00* | (2006.01) |
| *G01B 7/016* | (2006.01) |

(52) U.S. Cl.
CPC ............. *G01B 7/008* (2013.01); *G01B 5/016* (2013.01); *G01B 7/016* (2013.01); *G01B 11/005* (2013.01); *G01B 11/007* (2013.01)

(58) Field of Classification Search
None
See application file for complete search history.

(56) References Cited

U.S. PATENT DOCUMENTS

| | | | | |
|---|---|---|---|---|
| 5,029,398 A | * | 7/1991 | Ertl ........................ | G01B 5/012 33/561 |
| 5,659,969 A | * | 8/1997 | Butler .................. | G01B 11/007 33/561 |
| 5,887,356 A | * | 3/1999 | Sheldon ................ | G01B 7/012 33/559 |
| 6,099,217 A | * | 8/2000 | Wiegand ................ | B23Q 17/22 901/41 |
| 6,330,837 B1 | * | 12/2001 | Charles ................ | B25J 17/0266 901/29 |
| 6,336,375 B1 | * | 1/2002 | McMurtry ............. | B23Q 1/626 33/503 |
| 8,214,080 B2 | * | 7/2012 | Petterson ............... | B23Q 15/22 700/262 |
| 8,333,766 B2 | * | 12/2012 | Edelhauser ............ | A61B 17/62 606/56 |
| 8,806,974 B2 | | 8/2014 | Helmer | |

(Continued)

FOREIGN PATENT DOCUMENTS

| | | |
|---|---|---|
| CN | 2564840 Y | 8/2003 |
| CN | 1631612 A | 6/2005 |

(Continued)

OTHER PUBLICATIONS

State Intellectual Property Office, Second Office Action for Application No. 202010497189.5, dated May 6, 2022 May 6, 2022.

*Primary Examiner* — Christopher W Fulton
(74) *Attorney, Agent, or Firm* — Miller Johnson (57) ABSTRACT

An articulating probe for a measurement device includes a base platform, a rotor platform that is movable relative to the base platform, and a sensor element coupled to the rotor platform. The rotor platform is coupled to the base platform via a spherical parallel kinematic system.

14 Claims, 4 Drawing Sheets

(56) References Cited

U.S. PATENT DOCUMENTS

| | | | |
|---|---|---|---|
| 10,495,455 B2 * | 12/2019 | Pettersson | G01B 5/0004 |
| 2002/0007690 A1 | 1/2002 | Song et al. | |
| 2008/0034601 A1 * | 2/2008 | Pettersson | G01B 5/012 |
| | | | 33/559 |
| 2017/0348855 A1 | 12/2017 | Abe et al. | |
| 2017/0363403 A1 * | 12/2017 | Jonas | G01B 5/012 |

FOREIGN PATENT DOCUMENTS

| | | | | |
|---|---|---|---|---|
| CN | 101104269 A | 1/2008 | | |
| CN | 101180163 A | 5/2008 | | |
| CN | 101306534 A | 11/2008 | | |
| CN | 101797435 A | 8/2010 | | |
| CN | 102275161 A | 12/2011 | | |
| CN | 202684915 U | 1/2013 | | |
| CN | 104656675 A | 5/2015 | | |
| CN | 205614647 U | 10/2016 | | |
| DE | 3905952 A1 | 8/1990 | | |
| DE | 102019205042 A1 * | 10/2020 | | |
| EP | 1336818 A2 * | 8/2003 | | G01B 5/008 |
| EP | 2705935 A1 * | 3/2014 | | B25J 9/1623 |

* cited by examiner

Page 1
ARTICULATING PROBE

CROSS-REFERENCE TO RELATED APPLICATIONS

This application claims priority to German Patent Application No. 10 2019 115 630.0 filed Jun. 7, 2019. The entire disclosure of the application referenced above is incorporated by reference.

FIELD

This disclosure relates to an articulating probe for a measurement device. This disclosure furthermore relates to a measurement device with the articulating probe, in particular a coordinate measuring machine.

BACKGROUND

Measurement devices are generally used to determine geometric or physical variables, for example of workpieces, and can be designed, for example, as a roughness measurement device, hardness measurement device, surface measurement device or coordinate measuring machine. The herein presented measurement device is preferably a coordinate measuring machine.

Coordinate measuring machines serve for checking workpieces, for example as part of quality assurance, or for ascertaining the geometry of a workpiece entirely as part of what is known as "reverse engineering". Moreover, diverse further application possibilities are conceivable, such as e.g. process-controlling applications, in which the measurement technology is applied directly for online monitoring and online regulation of manufacturing and processing processes.

In coordinate measuring machines, different types of sensors may be used to capture the workpiece to be measured. In addition to sensors measuring on a tactile basis, use is also made of optical sensors, for example, that make contactless capturing of the coordinates of a measurement object or workpiece possible. There are also what are known as multi-sensor systems in which a plurality of tactile and/or optical sensors are used together.

Coordinate measuring machines known from the prior art typically have at least three translational degrees of freedom of movement which are realized, for example, by a movability of the measurement table along three axes. To further increase the freedom of movement or variability of the coordinate measuring machine, further components are typically attached to the coordinate measuring machine, which, for example, enable movement of a workpiece relative to a sensor element, for example by way of rotation about one or more rotation axes, and thus increase the number of degrees of freedom of the coordinate measuring machine.

In this case, what are known as rotary tables can be used for example, on which the workpiece to be measured is placed during the measurement process and is movable relative to the sensor element by way of a rotation of the rotary table about one or more rotation axes. Alternatively or for supplementary purposes, what are known as rotary swivel joints or swivel arms on which the sensor element of the coordinate measuring machine is provided can also be used in addition to rotary tables for workpieces. The rotary swivel joints are configured to move the sensor element relative to the workpiece by means of rotational and translational movement sequences about and/or along one or more axes. The rotary swivel joint together with the sensor element (independent of the type of sensor element) is usually referred to as articulating probe.

With the use of such rotatable or pivotable sensor elements, inter alia, the number of probe interchanges can be reduced or the interchanges can be avoided and paths arising from moving around the workpiece can be reduced. This helps increase the productivity of the coordinate measuring machine. Furthermore, due to the increased freedom of movement of the sensor element, the workpiece to be measured can be approached in its entirety, wherein for example measurement points on the surface can be approached which, without the additional freedom of movement of the sensor element relative to the workpiece, would be reachable only by reclamping, i.e. realigning, the workpiece.

Rotary swivel joints that are commercially available for the relative movability of sensor elements in relation to workpieces are available in various configuration stages and have, for example, one, two or three additional (rotational) degrees of freedom. As a well-known rotary swivel joint, the product REVO from Renishaw plc can be mentioned, for example.

A generally known problem concerning rotary swivel joints known from the prior art arises from the divergence of the masses or the mass moments of inertia with respect to the individual movement axes, which is in particular due to the serial configuration of the rotary swivel joints. For example, a movement axis is usually carried by a previous movement axis, which generally corresponds to a serial configuration of the kinematics. As a result of the serial configuration, any movement about the corresponding movement axis, which is basically intended to be a pure rotary movement, always comprises a translational movement component. This makes the movement sequence and thus regulation more complex.

In the case of kinematics with serial configuration, the movement axis located closest to the sensor element carries the lowest mass, specifically only that of the sensor element, and is therefore subject to the lowest mass moment of inertia during the rotary movement. The second movement axis, located after the first movement axis along the kinematic path starting from the sensor element, however, already has a higher mass, specifically the sum of the masses of the first movement axis and of the sensor element. This increase in mass results in the second movement axis already being subject to a correspondingly higher mass moment of inertia during a rotary movement. For a third movement axis in the kinematic path, the mass and thus the mass moment of inertia increase accordingly. Because of this, the divergence of the masses and mass moments of inertia occurs.

One solution approach is to modify the configuration of the kinematic path of rotary swivel joints in such a way that the first two movement axes intersect at a common point, that they consequently have a common center of rotation with two degrees of freedom. In this modification, however, the movement axis closest to the center of rotation, as viewed along the kinematic path starting from the sensor element, continues to have no point of intersection with the other two movement axes. Thus, even in this modified configuration of rotary swivel joints, there is still an (albeit smaller) divergence of the mass moments of inertia between the individual movement axes.

SUMMARY

It is an object to develop an articulating probe for a measurement device such that a divergence of the masses or mass moments of inertia between the individual movement axes along a kinematic path of the articulating probe is minimized.

According to a first aspect, an articulating probe is presented that comprises a base platform, a rotor platform that is movable relative to the base platform, and a sensor element coupled to the rotor platform, wherein the rotor platform is coupled to the base platform via a spherical parallel kinematic system.

According to a second aspect, a measurement is presented which comprises an articulating probe, wherein the articulating probe comprises a base platform, a rotor platform that is movable relative to the base platform, and a sensor element coupled to the rotor platform, wherein the rotor platform is coupled to the base platform via a spherical parallel kinematic system The herein presented articulating probe thus comprises a spherical parallel manipulator with a sensor element that is coupled to the moving platform of the spherical parallel manipulator.

An advantage of the spherical parallel kinematic system is that the moving mass is always almost the same due to the parallel structure of the spherical parallel kinematic system regardless of the Cartesian axis about which the rotor platform is moved with respect to the base platform. Only the mass moments of inertia differ depending on the rotational position of the rotor platform owing to the geometric configuration thereof. In this case, however, the divergence of the mass moments of inertia is significantly reduced compared to movement kinematics of a serial configuration.

Another advantage of the spherical parallel kinematic system is that owing to the embodiment, a rotation of the rotor platform or of the sensor element arranged on the rotor platform always takes place as a pure rotary movement about a common center of rotation, regardless of the spatial axis about which the rotation is performed. Thus, there is advantageously no translational movement component that leads to a divergence of the masses or the mass moments of inertia.

The term "articulating probe" is used herein independently of whether the sensor element is, for example, a portion of a tactile sensor, an optical sensor, a roughness sensor or a magnetic field sensor, as, for example, reference is also made to "optical probing" in the case of measurement by way of optical sensors.

In a refinement, the spherical parallel kinematic system comprises three separately controllable drive units, wherein a first drive unit of the three drive units comprises a first output shaft and is configured to rotate the first output shaft about a first rotation axis. A second drive unit of the three drive units comprises a second output shaft and is configured to rotate the second output shaft about a second rotation axis. A third drive unit of the three drive units comprises a third output shaft and is configured to rotate the third output shaft about a third rotation axis. The three drive units are preferably arranged substantially rotationally symmetrically about a normal axis of the base platform and fastened to the base platform.

The movement of the rotor platform with respect to the base platform is preferably effected via a separate control of the three drive units of the spherical parallel kinematic system, wherein for example, predefined target rotation angles by which the respective output shaft is to be rotated can serve as control commands.

The term "substantially rotationally symmetrical arrangement" of the three drive units on the base platform in the present case is understood to mean in particular that the three drive units are arranged rotationally symmetrically about a common center of rotation of the base platform. In this case, in each case two adjacent drive units are arranged on the base platform preferably with an offset of 120° with respect to one another. The three drive units are preferably arranged on a common circular path around the center of rotation and are preferably fastened to the base platform for conjoint rotation therewith.

The "normal axis" of the base platform is understood here to mean an axis extending orthogonally to a surface of the base platform, which is preferably arranged at the center of the rotationally symmetrical base platform, wherein the surface of the base platform preferably defines a horizontal plane.

In a further refinement, the first rotation axis, the second rotation axis and the third rotation axis have a common point of intersection that lies on the normal axis of the base platform.

The three rotation axes defined by the three drive units thus intersect in a common center of rotation (i.e. the point of intersection), which lies on the normal axis and is located at the center of the base platform owing to the rotationally symmetrical configuration. Due to the rotationally symmetrical configuration and the central attachment of the sensor element on the rotor platform, a longitudinal axis defined by the geometry of the sensor element preferably likewise pierces the point of intersection.

Due to the common point of intersection of the three rotation axes, rotation or movement of the rotor platform with respect to the base platform takes place only at the point of intersection.

In a further refinement, the spherical parallel kinematic system is configured such that the rotor platform performs a rotation movement with three rotational degrees of freedom around the point of intersection.

The rotation movement of the rotor platform is thus a pure rotational motion, without any translational movement component, and differs in particular from the rotary swivel joints known from the prior art.

In a further refinement, the rotor platform comprises a first coupling site, a second coupling site and a third coupling site, wherein the first coupling site is connected to the first output shaft via a first coupling, wherein the second coupling site is connected to the second output shaft via a second coupling, and wherein the third coupling site is connected to the third output shaft via a third coupling.

The rotor platform is preferably connected to the three output shafts of the three drive units only via the three couplings and thus accurately determined statically. The three coupling sites are preferably arranged rotationally symmetrically about a common center of the rotor platform at a rotation angle of 120° with respect to one another and are preferably reversibly detachably connected to the respective coupling.

The term "coupling" in the present sense can be understood to mean a linkage with a complex geometric configuration, which can consist, for example, of one or more rod parts that can be connected to one another via one or more joints.

Rotation of one of the three output shafts about the respective rotation axis is transferred via the respective coupling to the coupling site and thus to the rotor platform. The rotor platform performs a rotary movement about the point of intersection that corresponds to the rotary movement of the respective output shaft in terms of absolute value.

In a further refinement, the first coupling comprises a first linkage rod and a second linkage rod, wherein the first linkage rod is coupled to the second linkage rod via a first articulated joint that is configured such that the first linkage rod is rotatable with respect to the second linkage rod about a first joint axis of the first articulated joint. The second coupling comprises a third linkage rod and a fourth linkage rod, wherein the third linkage rod is coupled to the fourth linkage rod via a second articulated joint that is configured such that the third linkage rod is rotatable with respect to the fourth linkage rod about a second joint axis of the second articulated joint. The third coupling comprises a fifth linkage rod and a sixth linkage rod, wherein the fifth linkage rod is coupled to the sixth linkage rod via a third articulated joint that is configured such that the fifth linkage rod is rotatable with respect to the sixth linkage rod about a third joint axis of the third articulated joint.

In this case, one end of the first linkage rod of the first coupling is connected to the first output shaft. The first linkage rod is connected to the first articulated joint by way of the second end. The second linkage rod is connected at one end to the articulated joint and, at the other end, to the first coupling site of the rotor platform.

This configuration makes it possible for the rotary movement of the first output shaft to be transferable to the first coupling site and thus to the rotor platform via the first linkage rod, the first articulated joint and the second linkage rod. The same applies to the second and third couplings.

In a further refinement, the first linkage rod, the third linkage rod and the fifth linkage rod each have a same shape. By contrast, the second linkage rod, the fourth linkage rod and the sixth linkage rod each have a same shape that differs from the shape of the first linkage rod, the third linkage rod and the fifth linkage rod.

The phrase "a same shape" is understood here to mean that the first, the third and the fifth linkage rod are in each case equivalent components. In other words, they thus have the same geometry, shape and size. The same applies to the second, the fourth and the sixth linkage rods.

In a further refinement, the linkage rods are curved and/or angled about one or more axes.

Owing to this configuration, the complex shape of the individual linkage rods is described. which, for example, can be composed of a plurality of rod sections that extend in the form of a straight line and/or a curve with respect to one another at different angles of inclination.

In a further refinement, the first drive unit is configured to rotate the first coupling at least in a rotation range of ±60° about the first rotation axis of the first output shaft. The second drive unit is configured to rotate the second coupling at least in a rotation range of ±60° about the second rotation axis of the second output shaft. The third drive unit is configured to rotate the third coupling at least in a rotation range of ±60° about the third rotation axis of the third output shaft.

This refinement results in particular from the fact that, owing to the three drive units being arranged on the base platform for conjoint rotation therewith and to the inclination thereof with respect to the horizontal plane and owing to the geometric design of the couplings and linkage rods, no endless rotary movement of the output shafts about the respective rotation axis is possible, as otherwise there would be material penetration of the couplings with the base platform.

Although there is no linear relationship between the output-side angles (i.e. angles σx, σy, σz associated with the rotation of the rotor platform) and the drive angles (i.e. angles φ1, φ2, φ3 associated with the rotation of the output shafts about the rotation axes), the singularity can be maintained within the rotation angle limits of in each case, for example, ±60°, whereby an indication of a forward transformation σx=F (φ1, φ2, φ3), σy=F (φ1, φ2, φ3), σz=F (φ1, φ2, φ3) and also a backward transformation φ1=F (σx, σy, αz), φ2=F (σx, σy, σz) and φ3=F (σx, σy, σz) is uniquely possible.

In a further refinement, the first drive unit, the second drive unit and the third drive unit each have only one rotational degree of freedom and are also not movable.

In a further refinement, the first rotation axis is inclined with respect to a horizontal plane defined by the surface of the base platform by a first predefined angle of inclination. The second rotation axis is inclined with respect to the horizontal plane by a second predefined angle of inclination, and the third rotation axis is inclined with respect to the horizontal plane by a third predefined angle of inclination.

The output shafts of the respective drive units are therefore not oriented parallel to the surface of the base platform or to the horizontal plane but are inclined with respect to the horizontal plane in each case by an angle.

In a further refinement, the first, the second and the third angle of inclination are of the same size.

This refinement results in particular from the fact that the three rotation axes intersect in the common center of rotation, that is to say the common point of intersection.

In a further refinement, the first angle of inclination, the second angle of inclination and the third angle of inclination are each 60°.

This refinement relates in a manner of speaking to an arrangement of the three drive units in the form of an equilateral triangular pyramid, wherein the three drive units are arranged in the respective corner points of a base of the triangular pyramid. The common point of intersection of the rotation axes defines the pyramid tip of the equilateral triangular pyramid. In other configurations, angles of inclination that deviate from 60° are also possible.

In a refinement, the sensor element comprises a tactile sensing element, an optical sensor, a magnetic field sensor and/or a roughness sensor. In general, the sensor element can have a sensor for detecting geometric and/or physical variables of a workpiece.

The sensor element can be, for example, the tactile stylus of a tactile measurement sensor, wherein the actual sensor is arranged in a measurement head at a distance from the stylus and thus not on the articulating probe. Alternatively, the sensor element can also be an active probe with a sensor means. In the case of an optical measurement sensor (for example a camera), for example the entire optical sensor can be arranged on the articulating probe. However, it is also possible that only the optical unit of the optical measurement sensor is arranged on the articulating probe, while the optical capturing unit (the actual sensor or chip) is arranged at a distance from the optical unit, for example in a measurement head of the coordinate measuring machine.

The optical sensor can be, for example, a (1D, 2D or 3D) imaging optical sensor, an interferometric optical sensor or an optical white light sensor.

In a further refinement, the articulating probe further comprises a ball joint having a bearing stud with a spherical element and a bearing socket that receives the spherical element of the bearing stud. According to a first alternative, the bearing stud is fastened to the rotor platform and the bearing socket is fastened to the base platform. According to a second alternative, the bearing stud is fastened to the base platform and the bearing socket is fastened to the rotor platform.

In a further refinement, the rotor platform comprises a top side and an underside that is located opposite the top side and faces the base platform, wherein the bearing stud of the ball joint is arranged centrally on the underside of the rotor platform. The bearing stud secured in conjoint rotation with the rotor platform. The bearing stud of the ball joint is in rotatable engagement with the bearing socket of the ball joint, wherein the bearing socket is connected to the base platform for conjoint rotation therewith via a shaft.

The bearing stud preferably comprises a spherical element. The bearing socket is configured to receive the spherical element of the bearing stud. The bearing stud is rotatably mounted in a cup-shaped cavity of the bearing socket. This cup-shaped cavity has a shape of a spherical calotte.

This refinement has in particular the advantage that, owing to the attachment of the ball joint, the overall stability of the articulating probe can be increased and at the same time furthermore a purely rotational movement of the rotor platform about the point of intersection of the three rotation axes of the three drive units takes place. A center point of the spherical element of the bearing stud preferably coincides with the point of intersection of the three rotation axes of the three drive units.

None of the degrees of freedom of movement of the articulating probe is inhibited by the ball joint, yet a further bearing site for the total system is created, increasing the overall stability. In this embodiment, the rotor platform is thus not only coupled to the output shafts of the three drive units via the three couplings but also comprises a further connection site in the form of the ball joint.

The bearing socket, which is configured to hold the bearing stud of the ball joint in a cup-like cavity having a shape of a spherical calotte, is preferably attached at the center of the base platform. The spherical element of the bearing stud is inserted in the spherical calotte and rotatably mounted therein in a manner such that the spherical calotte holds at least half of the joint ball, but the socket projects only insignificantly beyond an equator of the spherical element of the bearing stud.

A further advantage of the attachment of the ball joint is that a 3D rotation measurement system can preferably be provided in the ball joint for measuring the orientation of the rotor platform (and thus the orientation of the probe), as a result of which the forward/backward transformation mentioned above can be omitted for the orientation determination of the rotor platform. Here, for example, a 3D magnetic measurement system can be used, in which the joint ball itself spans a magnetic field that can be detected by several Hall sensors arranged on a stator side, i.e. on the side of the spherical calotte.

It goes without saying that the features mentioned above and those yet to be explained below can be used not only in the combination that is respectively indicated, but also in other combinations or by themselves, without departing from the spirit and scope of the present disclosure.

DETAILED DESCRIPTION

Figure 1:
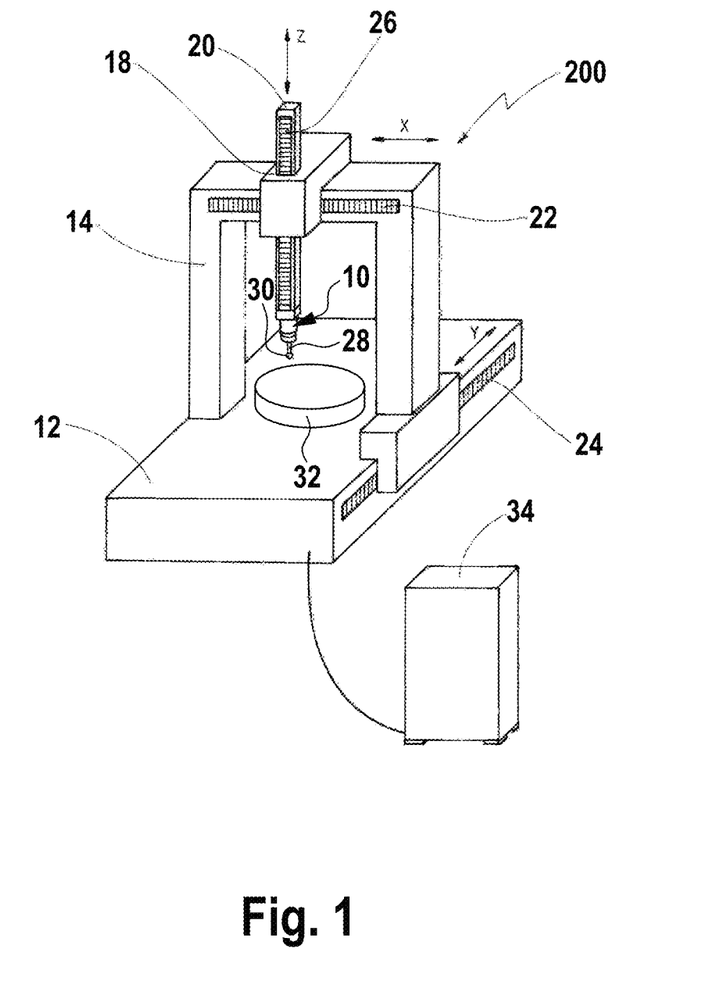
FIG. 1 shows a schematic illustration of an exemplary embodiment of a coordinate measuring machine.

FIG. 1 shows an exemplary embodiment of a coordinate measuring machine in which the herein presented articulating probe may be used. In general, however, the herein presented articulating probe may also be used with any other type of measurement device for the physical and/or geometric determination of workpiece properties.

The coordinate measuring machine is denoted in its entirety by the reference sign 200 and the articulating probe by the reference sign 10.

The coordinate measuring machine 200 comprises a base 12. A portal 14 is arranged on the base 12 such that it is displaceable in the longitudinal direction. The base 12 is preferably a stable plate, which is for example produced from granite. The portal 14 serves as a movable support structure. The portal 14 comprises two columns projecting upward from the base 12, which are connected by a crossbeam and have an inverted U-shape overall.

The direction of movement of the portal 14 relative to the base 12 is usually referred to as the Y-direction. A carriage 18, which is displaceable in the transverse direction, is arranged on the upper crossbeam of the portal 14. This transverse direction is usually referred to as the X-direction. The carriage 18 carries a ram 20, which is movable in the Z-direction, that is to say perpendicularly to the base 12.

Measurement devices on the basis of which the X-, Y- and Z-positions of the portal 14, the carriage 18 and the ram 20 can be determined are denoted by the reference signs 22, 24, 26. The measurement devices 22, 24, 26 are typically glass rulers, which serve as measuring scales. These measuring scales are formed in conjunction with corresponding reading heads (not shown here) to determine the respectively current position of the portal 14 in relation to the base 12, the position of the carriage 18 in relation to the upper crossbeam of the portal 14 and the position of the ram 20 in relation to the carriage 18.

At a lower, free end of the ram 20, an embodiment of the articulating probe 10 is arranged, which will be explained in more detail in the following FIGS. 2-4. In the present case, the articulating probe 10 is fastened to a lower end of the ram 20 facing the base 12 so that it can be interchanged.

It should be noted that a coordinate measuring machine 200 of a portal design is explained in FIG. 1 only by way of example. In principle, the articulating probe 10 can, however, also be used in coordinate measuring machines of a cantilever-arm, bridge or stand design. Depending on the type of construction of the coordinate measuring machine 200, the relative movement between the base 12 and the articulating probe 10 along one, two or all three spatial directions can be implemented by a movability of the base 12 or a workpiece receptacle. In addition, the variability of the coordinate measuring machine 200 can be increased by further degrees of freedom of movement, for example by rotating the articulating probe 10.

Alternatively, the coordinate measuring machine 200 can be designed as an articulated arm system (for example of a robot) with a large number of degrees of freedom. For example, the coordinate measuring machine 200 can be configured as a component of a robot, for example as a robot arm, on the end effector (not shown) of which the articulating probe 10 is arranged. In other words, this means that the kinematic component of the coordinate measuring machine 200 is in this case not limited to systems that are movable along three axes. The term "coordinate measuring machine" is accordingly to be interpreted broadly as any type of system that is suitable for capturing coordinates of a measurement object.

In the exemplary embodiment shown in FIG. 1, the articulating probe 10 comprises a sensor element 28 (stylus) that projects in the Z-direction toward the base 12. In the present case, the sensor element 28 is a stylus of a tactile measurement sensor. In other exemplary embodiments, which are not shown here, the articulating probe 10 can also have a plurality of sensor elements 28, for example a plurality of tactile styluses, sensor elements, roughness sensors and/or optical measurement sensors, which can project in different spatial directions. The number and orientation of the individual sensor elements 28 depend on the geometry of the workpiece to be measured or on the number and location of the measurement points to be measured.

The sensor element 28 is set up in the present case to probe the surface of a workpiece 32 by means of its probe head 30. The probe head 30 is produced from a ruby sphere, for example. The sensor element 28 is rotatable individually and in combination about each of the three spatial axes X, Y, Z due to its arrangement on the articulating probe 10.

When probing a large number of measurement points of, for example, the workpiece 32, position and location information of the probe head 30 are transmitted by the probe head 30 to a control unit 34 of the coordinate measuring machine 200 either wirelessly or via one or more cables depending on the operation of the sensor element 28. The control unit 34 determines, for example, the spatial coordinates of the respective measurement point and ascertains the geometry of the workpiece 32 by evaluating a large number of measurement points.

Figure 2:
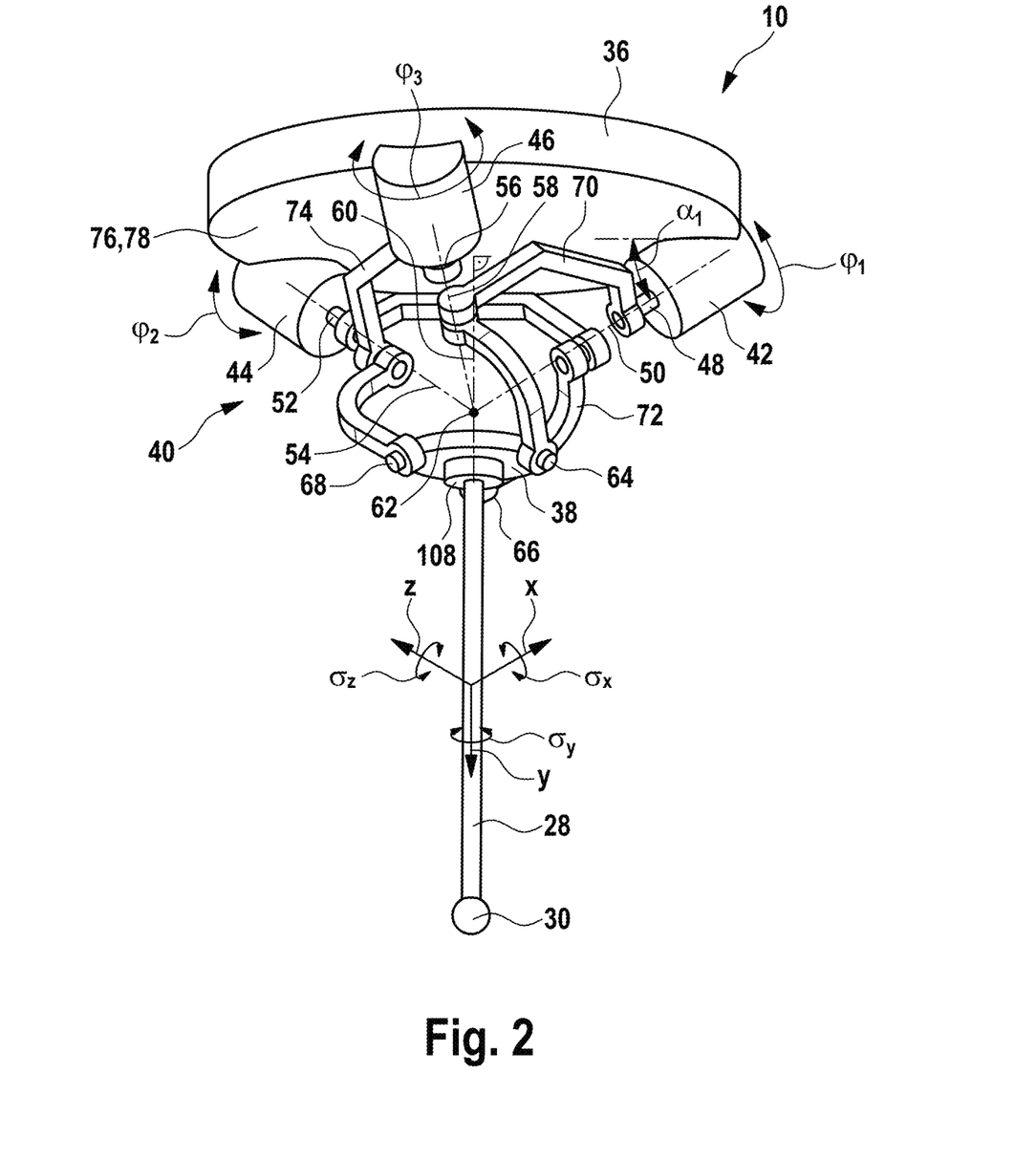
FIG. 2 shows a perspective view of a first exemplary embodiment of an articulating probe.
Figure 3:
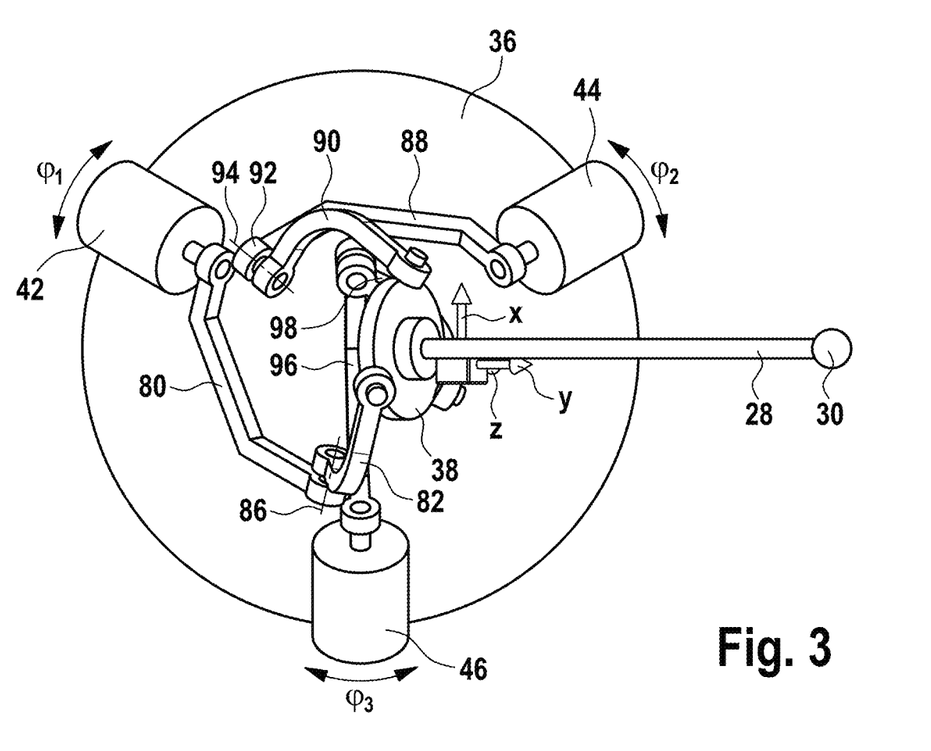
FIG. 3 shows a plan view of the articulating probe according to the first exemplary embodiment during a rotation about an x-axis.
Figure 4:
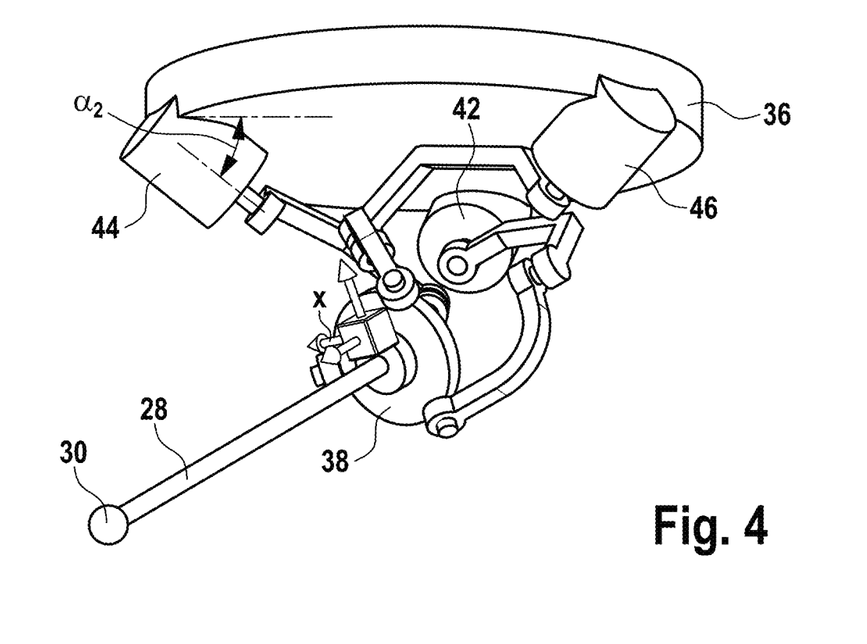
FIG. 4 shows a perspective view of the articulating probe according to the first exemplary embodiment during a rotation about the x-axis.

FIGS. 2-4 illustrate a first exemplary embodiment of the articulating probe 10. The articulating probe 10 comprises a base platform 36. The base platform 36 can, for example, be a solid plate made of metal and can be configured to be fastened to a measurement sensor receptacle, for example the ram 20 of the coordinate measuring machine 200. For example, the base platform 36 can be designed as an interchanging plate of the coordinate measuring machine 200.

The articulating probe 10 comprises a rotor platform 38 that is movable relative to the base platform 36, wherein the rotor platform 38 in the present case has a smaller dimension than the base platform 36. The sensor element 28 is fastened to the rotor platform 38 or is integrally connected thereto. The rotor platform 38 is coupled to the base platform 36 via a spherical parallel kinematic system 40.

The spherical parallel kinematic system 40 comprises three separately controllable drive units: first drive unit 42, second drive unit 44, and third drive unit 46. The first drive unit 42 comprises a first output shaft 48 and is configured to rotate the first output shaft 48 about a first rotation axis 50. The second drive unit 44 comprises a second output shaft 52 and is configured to rotate the second output shaft 52 about a second rotation axis 54. The third drive unit 46 comprises a third output shaft 56 and is configured to rotate the third output shaft 56 about a third rotation axis 58.

The three drive units 42, 44, 46 are arranged substantially rotationally symmetrically about a normal axis 60 of the base platform 36 and fastened to the base platform 36 for conjoint rotation therewith. The three drive units 42, 44, 46 can be designed, for example, as electrically, pneumatically or otherwise operated servo or stepper motors.

The first rotation axis 50, the second rotation axis 54 and the third rotation axis 58 intersect in a common point of intersection 62, which lies on the normal axis 60. In the present case, the point of intersection 62, as viewed along the normal axis 60, is closer to the rotor platform 38 than to the base platform 36. The point of intersection 62 preferably lies on an underside of the rotor platform 38 that faces the base platform 36.

The first drive unit 42, the second drive unit 44 and the third drive unit 46 each have only one rotational degree of freedom about the respective rotation axis 50, 54, 58, which means, in other words, that the three drive units 42, 44, 46 are each only configured to rotate the output shafts 48, 52, 56 about the respective rotation axes 50, 54, 58.

By way of controlling each individual one of the three drive units 42, 44, 46 in a mutually synchronized manner, the rotor platform 38 or the sensor element 28 can be rotated individually or in combination about each of the three spatial directions X, Y, Z of a global coordinate system. For this purpose, predefined control commands are transmitted to each individual one of the three drive units 42, 44, 46, for example in the form of rotational (or setting) angle information, for example via the control unit 34 (see FIG. 1).

The rotation of the respective output shaft of the three drive units 42, 44, 46 resulting from the control commands is transferred to the rotor platform 38, as a result of which the latter is made to perform a rotation, corresponding to the control command, about the center of rotation or the point of intersection 62. Depending on the control of the three drive units 42, 44, 46, the rotor platform 38 can thus be moved about all three axes X, Y, Z of the global coordinate system and always performs only one rotation about the point of intersection 62. The sensor element 28 connected to the rotor platform 38 for conjoint rotation therewith, or the probe head 30 arranged on the tactile sensor element, can in this case approach any point on an imaginary surface of an imaginary spherical surface portion by means of corresponding, synchronized control of the three drive units 42, 44, 46. In other words, the rotor platform 38 comprises three rotational degrees of freedom around the point of intersection 62, wherein the rotary movement has no translational movement component.

The rotary movement is transferred to the rotor platform 38 starting from at least one output shaft 48, 52, 56 that is made to rotate via a coupling arranged on each of the output shafts 48, 52, 56. For this purpose, the rotor platform 38 comprises a first coupling site 64, a second coupling site 66 and a third coupling site 68, which are arranged in a rotationally symmetrical manner in relation to one another on the rotor platform 38 at a rotation angle of 120°. In the present case, the coupling sites 64, 66, 68 are pin-like bolt elements that are fastened to the rotor platform 38 and arranged on the circular outer periphery of the rotor platform 38 in a rotationally symmetrical manner in relation to one another.

The first coupling site 64 is connected to the first output shaft 48 via a first coupling 70. The second coupling site 66 is connected to the second output shaft 52 via a second coupling 72, and the third coupling site 68 is connected to the third output shaft 56 via a third coupling 74.

The three drive units 42, 44, 46 and the rotation axes 50, 54, 58 are each inclined with respect to a horizontal plane 78 defined by a surface 76 of the base platform 36 by a predefined angle of inclination α1, α2, α3, wherein in the present case, the angles of inclination α1, α2, α3 are the same size and are each 60° with respect to the horizontal plane 78.

In addition, the first drive unit 42 is configured to rotate the first coupling 70 in at least a rotation range of ±60° about the first rotation axis 50 of the first output shaft 48. The second drive unit 44 is configured to rotate the second coupling 72 at least in a rotation range of ±60° about the second rotation axis 54 of the second output shaft 52, and the third drive unit 46 is configured to rotate the third coupling 74 at least in a rotation range of ±60° about the third rotation axis 58 of the third output shaft 56.

FIGS. 3-4 show the first embodiment of the articulating probe 10 in both a plan view (FIG. 3) and a perspective view (FIG. 4). Compared to the position shown in FIG. 2, the articulating probe 10 is rotated about the X-axis of the global coordinate system. This rotation about the common point of intersection 62 of the rotation axes 50, 54, 58 resulted from a preferably synchronized control of the three drive units 42, 44, 46. In the case shown, each output shaft 48, 52, 56 was rotated by the predefined rotation angle φ1, φ2, φ3.

As is shown in FIGS. 3-4, the first coupling 70 comprises a first linkage rod 80 and a second linkage rod 82. The first linkage rod 80 is coupled to the second linkage rod 82 via a first articulated joint 84. The first articulated joint 84 is configured such that the first linkage rod 80 is rotatable with respect to the second linkage rod 82 about a first joint axis 86 of the first articulated joint 84. The second coupling 72 comprises a third linkage rod 88 and a fourth linkage rod 90, wherein the third linkage rod 88 is coupled to the fourth linkage rod 90 via a second articulated joint 92 that is configured such that the third linkage rod 88 is rotatable with respect to the fourth linkage rod 90 about a second joint axis 94 of the second articulated joint 92 (see also FIG. 5). The third coupling 74 comprises a fifth linkage rod 96 and a sixth linkage rod 98. The fifth linkage rod 96 is coupled to the sixth linkage rod 98 via a third articulated joint 100, wherein the articulated joint 100 is configured such that the fifth linkage rod 96 is rotatable with respect to the sixth linkage rod 98 about a third joint axis 102 of the third articulated joint 100.

The linkage rods 80, 82, 84, 88, 90, 96, 98 are here in each case curved and angled about a plurality of axes and have both rod parts that extend rectilinearly and bent rod parts. The respective design of the linkage rods 80, 82, 88, 90, 96, 98 can differ depending on the type of spherical parallel kinematic system.

The first linkage rod 80, the third linkage rod 88 and the fifth linkage rod 96 in the present case each have a same geometric shape. In other words, this means that the linkage rods 80, 88, 96 have the same angles and curvatures. The second linkage rod 82, the fourth linkage rod 90 and the sixth linkage rod 98 likewise have a same geometric shape, but their geometry is different from that of the first linkage rod 80 the third linkage rod 88 and the fifth linkage rod 96.

Figure 5:
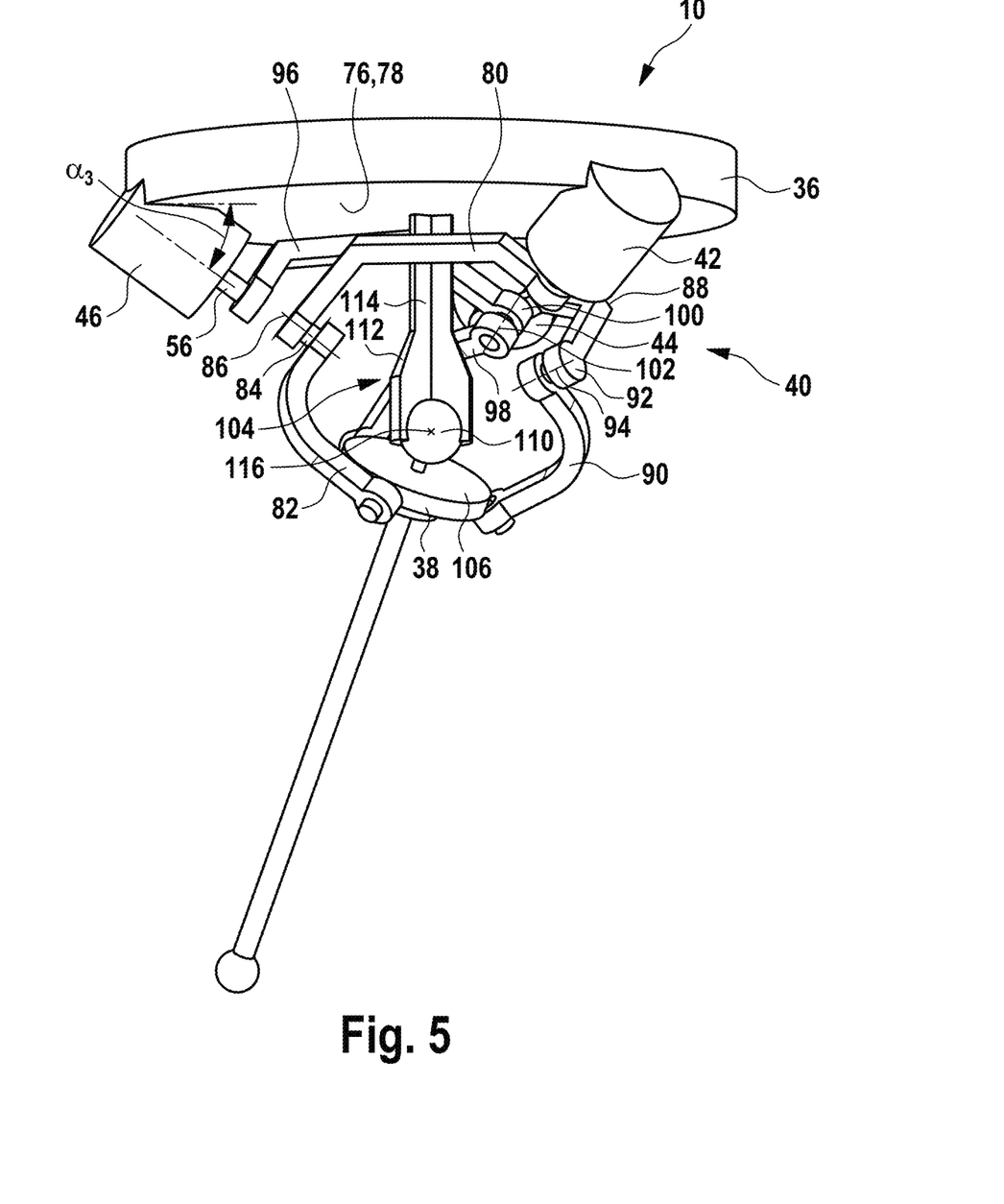
FIG. 5 shows a perspective view of a second exemplary embodiment of the articulating probe.

FIG. 5 shows a second exemplary embodiment of the articulating probe 10. In this exemplary embodiment, a ball joint 104 is furthermore attached to an underside 106 of the rotor platform 38 for an additional stabilization of the articulating probe 10. The underside 106 of the rotor platform 38 here lies opposite a top side 108 of the rotor platform 38 and is arranged in the direction of the base platform 36. On the underside 106 of the rotor platform 38, a bearing stud 110 of the ball joint 104 is arranged concentrically, that is to say at a center of the rotor platform 38, which bearing stud 110 is in rotatable engagement with a bearing socket 112. The bearing stud 110 comprises a spherical element. The bearing socket 112 is configured to receive the spherical element of the bearing stud 110. The bearing stud 110 is rotatably mounted in a cup-shaped cavity of the bearing socket 112. This cup-shaped cavity has a shape of a spherical calotte. The bearing socket 112 is mounted via a shaft 114 with respect to the base platform 36 in an orientation along the normal axis 60 of the base platform 36 for conjoint rotation therewith. In the present case, a center point 116 of the spherical element of the bearing stud 110 coincides with the point of intersection 62.

The phrase at least one of A, B, and C should be construed to mean a logical (A OR B OR C), using a non-exclusive logical OR, and should not be construed to mean "at least one of A, at least one of B, and at least one of C."

What is claimed is:
1. An articulating probe for a measurement device, the articulating probe comprising:
a base platform;
a rotor platform that is movable relative to the base platform; and
a sensor element coupled to the rotor platform, wherein:
the rotor platform is coupled to the base platform via a spherical parallel kinematic system,
the spherical parallel kinematic system comprises three separately controllable drive units,
a first drive unit of the three drive units comprises a first output shaft and is configured to rotate the first output shaft about a first rotation axis,
a second drive unit of the three drive units comprises a second output shaft and is configured to rotate the second output shaft about a second rotation axis,
a third drive unit of the three drive units comprises a third output shaft and is configured to rotate the third output shaft about a third rotation axis,
the three drive units are arranged rotationally symmetrically about a normal axis of the base platform and are fastened to the base platform, and
the first rotation axis, the second rotation axis, and the third rotation axis have a common point of intersection that lies on the normal axis.
2. The articulating probe of claim 1, wherein the spherical parallel kinematic system is configured such that the rotor platform performs a rotation movement with three rotational degrees of freedom about the point of intersection.
3. The articulating probe of claim 1, wherein:
the rotor platform comprises a first coupling site, a second coupling site and a third coupling site,
the first coupling site is connected to the first output shaft via a first coupling,
the second coupling site is connected to the second output shaft via a second coupling, and
the third coupling site is connected to the third output shaft via a third coupling.
4. The articulating probe of claim 3, wherein:
the first coupling comprises a first linkage rod and a second linkage rod,
the first linkage rod is coupled to the second linkage rod via a first articulated joint,
the first articulated joint is configured such that the first linkage rod is rotatable with respect to the second linkage rod about a first joint axis,
the second coupling comprises a third linkage rod and a fourth linkage rod,
the third linkage rod is coupled to the fourth linkage rod via a second articulated joint, the second articulated joint is configured such that the third linkage rod is rotatable with respect to the fourth linkage rod about a second joint axis, the third coupling comprises a fifth linkage rod and a sixth linkage rod, the fifth linkage rod is coupled to the sixth linkage rod via a third articulated joint, and the third articulated joint is configured such that the fifth linkage rod is rotatable with respect to the sixth linkage rod about a third joint axis.

5. The articulating probe of claim 4, wherein:
the first linkage rod, the third linkage rod, and the fifth linkage rod each have a first shape,
the second linkage rod, the fourth linkage rod, and the sixth linkage rod each have a second shape, and
the first shape is different from the second shape.

6. The articulating probe of claim 5, wherein the linkage rods are each curved and/or angled about one or more axes.

7. The articulating probe of claim 3, wherein:
the first drive unit is configured to rotate the first coupling at least in a rotation range of ±60° about the first rotation axis of the first output shaft,
the second drive unit is configured to rotate the second coupling at least in a rotation range of ±60° about the second rotation axis of the second output shaft, and
the third drive unit is configured to rotate the third coupling at least in a rotation range of ±60° about the third rotation axis of the third output shaft.

8. The articulating probe of claim 1, wherein the first drive unit, the second drive unit and the third drive unit each have only one rotational degree of freedom.

9. The articulating probe of claim 1, wherein:
the first rotation axis is inclined with respect to a horizontal plane defined by a surface of the base platform by a first predefined angle of inclination,
the second rotation axis is inclined with respect to the horizontal plane by a second predefined angle of inclination, and
the third rotation axis is inclined with respect to the horizontal plane by a third predefined angle of inclination.

10. The articulating probe of claim 9, wherein the first predefined angle of inclination, the second predefined angle of inclination, and the third predefined angle of inclination are of same size.

11. The articulating probe of claim 1, further comprising:
a ball joint having a bearing stud with a spherical element and a bearing socket that receives the spherical element of the bearing stud,
wherein the bearing stud is fastened to the rotor platform, and
wherein the bearing socket is fastened to the base platform.

12. The articulating probe of claim 1, further comprising:
a ball joint having a bearing stud with a spherical element and a bearing socket that receives the spherical element of the bearing stud,
wherein the bearing stud is fastened to the base platform, and
wherein the bearing socket is fastened to the rotor platform.

13. The articulating probe of claim 1, wherein the sensor element comprises at least one of a tactile sensing element, an optical sensor, a magnetic field sensor, and a roughness sensor.

14. A measurement device comprising:
an articulating probe comprising:
a base platform;
a rotor platform that is movable relative to the base platform; and
a sensor element coupled to the rotor platform, wherein:
the rotor platform is coupled to the base platform via a spherical parallel kinematic system,
the spherical parallel kinematic system comprises three separately controllable drive units,
a first drive unit of the three drive units comprises a first output shaft and is configured to rotate the first output shaft about a first rotation axis,
a second drive unit of the three drive units comprises a second output shaft and is configured to rotate the second output shaft about a second rotation axis,
a third drive unit of the three drive units comprises a third output shaft and is configured to rotate the third output shaft about a third rotation axis,
the three drive units are arranged rotationally symmetrically about a normal axis of the base platform and are fastened to the base platform, and
the first rotation axis, the second rotation axis, and the third rotation axis have a common point of intersection that lies on the normal axis.

* * * * *